(12) United States Patent
Fernández Gutiérrez

(10) Patent No.: US 7,640,333 B1
(45) Date of Patent: Dec. 29, 2009

(54) METHOD AND DEVICE FOR MANAGING MULTICAST GROUPS

(75) Inventor: Alvaro Fernández Gutiérrez, Barcelona (ES)

(73) Assignee: Media Patents, S.L., Barcelona (ES)

( * ) Notice: Subject to any disclaimer, the term of this patent is extended or adjusted under 35 U.S.C. 154(b) by 0 days.

(21) Appl. No.: 12/392,958

(22) Filed: Feb. 25, 2009

Related U.S. Application Data

(63) Continuation of application No. PCT/EP2007/008655, filed on Oct. 5, 2007.

(30) Foreign Application Priority Data

Jun. 26, 2007 (ES) ................. 200701775

(51) Int. Cl.
*G06F 15/173* (2006.01)
*G06F 15/177* (2006.01)

(52) U.S. Cl. ..................... 709/223; 709/220

(58) Field of Classification Search .............. 709/223, 709/220
See application file for complete search history.

(56) References Cited

U.S. PATENT DOCUMENTS

| | | | |
|---|---|---|---|
| 6,331,983 B1 | 12/2001 | Haggerty et al. | |
| 7,236,465 B2 | 6/2007 | Banerjee et al. | |
| 7,346,053 B1 | 3/2008 | Leung et al. | |
| 7,385,977 B2 | 6/2008 | Wu et al. | |
| 7,450,551 B2 | 11/2008 | Lim et al. | |
| 2003/0123453 A1 | 7/2003 | Ooghe et al. | |
| 2004/0122890 A1 | 6/2004 | Watkinson | |
| 2004/0158872 A1* | 8/2004 | Kobayashi | ............. 725/120 |
| 2004/0190542 A1 | 9/2004 | Ono et al. | |
| 2004/0252690 A1 | 12/2004 | Pung et al. | |
| 2005/0190765 A1 | 9/2005 | Gotoh et al. | |
| 2005/0265374 A1 | 12/2005 | Pelt | |
| 2006/0036733 A1 | 2/2006 | Fujimoto et al. | |
| 2006/0050643 A1 | 3/2006 | Yoshimoto et al. | |
| 2006/0088031 A1 | 4/2006 | Nalawade | |
| 2006/0146857 A1 | 7/2006 | Naik et al. | |

(Continued)

FOREIGN PATENT DOCUMENTS

EP    1185125 A1    3/2002

(Continued)

OTHER PUBLICATIONS

Cain et al., Internet Group Management Protocol, Version 3 (IGMPv3), Network Working Group Standards Track, Oct. 2002, p. 1-54, The Internet Society.

*Primary Examiner*—Kenny S Lin
(74) *Attorney, Agent, or Firm*—Tim L. Kitchen; Peter B. Scull; Berenbaum Weinshienk PC

(57) ABSTRACT

A method for managing multicast traffic in a data network, and devices using said method. The hosts store for each multicast group an included source record and an excluded source record, and the network interfaces of the hosts send to the router a message containing information about the included source record and information about the excluded source record. The router also stores for each multicast group an included source record and an excluded source record, and updates them when it receives through its network interface a message from the hosts containing information about an included source list and/or information about an excluded source list. The devices are a router, host equipment and network equipment compatible with the method.

16 Claims, 6 Drawing Sheets

U.S. PATENT DOCUMENTS

| | | |
|---|---|---|
| 2006/0159092 A1 | 7/2006 | Boers et al. |
| 2006/0209829 A1 | 9/2006 | Lo et al. |
| 2006/0221861 A1 | 10/2006 | Previde et al. |
| 2006/0221958 A1 | 10/2006 | Wijnands et al. |
| 2006/0239289 A1 | 10/2006 | Zheng et al. |
| 2006/0274720 A1* | 12/2006 | Adams et al. ............... 370/351 |
| 2007/0011350 A1 | 1/2007 | Lu et al. |
| 2007/0047545 A1 | 3/2007 | Bou-Diab et al. |
| 2007/0064695 A1 | 3/2007 | Song et al. |
| 2007/0124454 A1 | 5/2007 | Watkinson |
| 2007/0168555 A1 | 7/2007 | Dorenbosch |
| 2007/0177594 A1 | 8/2007 | Kompella |
| 2007/0211722 A1 | 9/2007 | Subramanian |
| 2008/0095183 A1 | 4/2008 | Bijwaard et al. |
| 2008/0219237 A1 | 9/2008 | Thubert et al. |
| 2009/0059911 A1* | 3/2009 | Fine ........................... 370/384 |
| 2009/0100147 A1 | 4/2009 | Igarashi |
| 2009/0190518 A1* | 7/2009 | Kim et al. .................... 370/312 |

FOREIGN PATENT DOCUMENTS

| | | |
|---|---|---|
| EP | 1432172 A2 | 6/2004 |
| WO | WO0203614 A2 | 1/2002 |

* cited by examiner

```
+-+-+-+-+-+-+-+-+-+-+-+-+-+-+-+-+-+-+-+-+-+-+-+-+-+-+-+-+-+-+-+-+
|  Record Type  |  Aux Data Len |        Number of Sources (N)  |
+-+-+-+-+-+-+-+-+-+-+-+-+-+-+-+-+-+-+-+-+-+-+-+-+-+-+-+-+-+-+-+-+
|                        Multicast Address                      |
+-+-+-+-+-+-+-+-+-+-+-+-+-+-+-+-+-+-+-+-+-+-+-+-+-+-+-+-+-+-+-+-+
|                        Source Address [1]                     |
+-+-+-+-+-+-+-+-+-+-+-+-+-+-+-+-+-+-+-+-+-+-+-+-+-+-+-+-+-+-+-+-+
|                        Source Address [2]                     |
+-+-+-+-+-+-+-+-+-+-+-+-+-+-+-+-+-+-+-+-+-+-+-+-+-+-+-+-+-+-+-+-+
.                               .                               .
.                               .                               .
+-+-+-+-+-+-+-+-+-+-+-+-+-+-+-+-+-+-+-+-+-+-+-+-+-+-+-+-+-+-+-+-+
|                        Source Address [N]                     |
+-+-+-+-+-+-+-+-+-+-+-+-+-+-+-+-+-+-+-+-+-+-+-+-+-+-+-+-+-+-+-+-+
|                         Auxiliary Data                        |
.                               .                               .
.                               .                               .
+-+-+-+-+-+-+-+-+-+-+-+-+-+-+-+-+-+-+-+-+-+-+-+-+-+-+-+-+-+-+-+-+
```

FIG. 3

METHOD AND DEVICE FOR MANAGING MULTICAST GROUPS

CROSS-REFERENCE TO RELATED APPLICATIONS

This application claims priority to and the benefit of PCT/EP2007/008655 filed Oct. 5, 2007, which claims priority to and the benefit of Spanish Patent Application No. 200701775, filed Jun. 26, 2007.

FIELD OF THE INVENTION

The invention is comprised in the field of multicast technology in data networks. More specifically, the invention relates to a method for managing multicast traffic in a data network, in which sources send data addressed to at least one multicast group and a plurality of hosts receive from a router the data sent by one or several of said sources sending in said multicast group, said hosts and said router communicating to one another by means of a communications protocol, such as for example the IGMP protocol (Internet Group Management Protocol) or the MLD (Multicast Listener Discovery) protocol, allowing multicast host-router communications through which said host can define, for said multicast group, an included source list to indicate that it wishes to receive the data sent by the sources of said list and an excluded source list to indicate that it wishes to receive the traffic from all the sources of said multicast group except the sources of said list.

The invention also relates to devices applying said method.

STATE OF THE ART

Multicast technology makes it possible to send data from a single source to many receivers through a data network, without having to set up unicast communication, i.e. one-to-one individual communication between the source and each of the receivers. To that end the source sends data, in data packet form, to a single address associated to a multicast group to which the equipment interested in being receivers of said data sending can subscribe. This address, referred to as a multicast address or also as a multicast group address, is an IP (Internet Protocol) address chosen within a range that is reserved for multicast applications. The data packets which have been sent by the source to the multicast address are then replicated in the different network routers so that they can reach the receivers that have joined the multicast group.

Data sending receivers in a multicast group are usually equipment connected to the data network by means of a proxy or a router. Hereinafter, the common term host will be used to refer to said equipment. A host can be, for example, a computer or a set-top box connected to a television set.

When a host wants to receive the information sent by one or several sources of a multicast group, it sends to the closest router, or to an intermediate proxy, a subscription message to subscribe to said group so that the router transmits to it the data arriving through the data network and which has been sent by the sources of the multicast group.

Likewise, when a host wishes to stop receiving data sendings in the multicast group, it sends to the router or to the proxy an unsubscribe message to stop receiving them.

The messages exchanged between a host and the closest router to manage membership to a multicast group use the IGMP protocol (Internet Group Management Protocol) or the MLD (Multicast Listener Discovery) protocol, according to whether or not the router works with version 4 (IPv4) or version 6 (IPv6) of the IP protocol (Internet Protocol), respectively.

When there is a proxy between the host and the router, the proxy also uses the IGMP/MLD protocols to exchange with the host, the closest router or other intermediate proxy, the multicast group membership messages. In these cases, the proxy can receive from different hosts petitions to subscribe to or to unsubscribe from a multicast group, and it assembles them to thus reduce IGMP/MLD message traffic it sends to the router.

In addition, routers exchange messages with one another for the purpose of defining the routing which allows efficiently routing the data from the sources to the hosts that have subscribed to a multicast group. To that end, the routers use specific protocols, including the very well known PIM-SM (Protocol Independent Multicast—Sparse Mode).

In summary, the routers receive from the hosts, in the form of IGMP/MLD messages, information specifying which multicast groups they want to receive traffic from, and they communicate with other routers, for example by means of the PIM-SM protocol, for the purpose of setting up a routing which takes the traffic requested by the hosts to such hosts.

All the mentioned protocols are defined and documented by the Internet Engineering Task Force (IETF).

The IGMP protocol version currently being used is IGMPv3, which is described in the RFC 3376 specifications published on line by the IETF (B. Cain et al., Engineering Task Force, Network Working Group, Request for Comments 3376, October 2002; currently available at Internet address http://tools.ietf.org/html/rfc3376).

With regard to the MDL protocol, the version currently being used is MDLv2, which is described in the RFC 3810 specifications published on line by the IETF (R. Vida et al., Engineering Task Force, Network Working Group, Request for Comments 3810, June 2004; currently available at Internet address http://tools.ietf.org/html/rfc3810).

The operation of an IGMP proxy using the IGMP/MLD protocols is described in the RFC 4605 specifications published on line by the IETF (B. Fenner et al., Engineering Task Force, Network Working Group, Request for Comments 4605, August 2006; currently available at Internet address http://tools.ietf.org/html/rfc4605).

The PIM-SM protocol used for the communication between routers is described in the RFC 4601 specifications published on line by the IETF (B. Fenner et al., Engineering Task Force, Network Working Group, Request for Comments 4601, August 2006; currently available at Internet address http://tools.ietf.org/html/rfc4601).

Multicast technology was initially implemented primarily to be applied to the many-to-many communication model, known as ASM (Any Source Multicast), in which many users communicate with one another and any of them can send data and also receive data from everyone else. A typical ASM application is multiparty calling via Internet.

Multicast technology was then implemented to be applied to the one-to-many communication model known as SSM (Source Specific Multicast), in which a single source sends data for many receivers. Radio and television via Internet are SSM applications. This is why SSM is currently very interesting.

In earlier IGMP protocol versions, a host could not choose the data sending sources it wanted to subscribe to within a multicast group, rather the host could only subscribe to or unsubscribe from the group for all the sources. The messages a host sent to a router were very simple: Join (G) to receive traffic from the multicast group G and Leave (G) to stop receiving it. Therefore, earlier IGMP protocol versions did not allow SSM.

The possibility that the hosts could choose the sources within a multicast group was introduced in the IGMPv3 version of the IGMP protocol, to allow SSM. To that end, a host can send two types of IGMP messages:

An INCLUDE message, consisting of indicating source IP addresses from which the host wishes to receive data sending. According to the terminology of the RFC 3376 specifications, the IP addresses of these included sources are referred to as INCLUDE sources.

An EXCLUDE message, consisting of indicating the source IP addresses from which the host does not wish to receive data sending. In this case, it is interpreted that the host wishes to receive data sent by all the sources except the sources indicated as excluded in the message. Also according to the terminology of the RFC 3376 specifications, the IP addresses of these excluded sources are referred to as EXCLUDE sources.

A network interface can receive several different requests for each multicast group G1. Each request contains, for the same multicast group, an INCLUDE source list or an EXCLUDE source list. To solve this situation and to maintain the restriction that each network interface can only operate either in INCLUDE mode or in EXCLUDE mode, the IGMPv3 protocol provides that the network interface must apply the following rules:

Rule 1. If any of the data sources of a group G1 is EXCLUDE, then the network interface operates in EXCLUDE mode for the group G1 and the source list of the network interface is the intersection of the EXCLUDE source lists minus the sources of the INCLUDE lists.

Rule 2. If all the sources are INCLUDE sources, then the network interface operates in INCLUDE mode for the group G1 and the source list of the network interface is the union of all the INCLUDE sources.

As will be understood below with the description of several embodiments of the invention, these rules considerably complicate communications.

In ASM multicast, when a host wants to receive traffic from a specific multicast group G, it is necessary to solve the following technical problem: the host only knows the address of the multicast group G and does not know the source IP addresses of that group G which are sending data. There are different multicast communication protocols between routers which solve this problem in different ways. Today, the PIM-SM protocol is primarily applied and it solves the problem by designating a router referred to as Rendez-vous Point, hereinafter RP router, as the router in charge of knowing all the sources of a single multicast domain (group of routers using the same RP router). In order to find out the source IP addresses, each router sets up a first multicast communication with the RP router so that the latter will send it the requested multicast traffic. When the router receives the first multicast traffic data, it discovers the source IP addresses. Then, the last router, i.e. the router receiving the IGMP messages directly from the hosts, tries to receive the data directly from the sources by using the SPT tree (Shortest Path Tree), which sets up the shortest path through the network, referred to as the SPT path. When the router starts to receive data in duplicate form, both through the RP router and directly through the SPT path, it cuts off communication with the RP router and keeps only direct communication through the SPT path.

In SSM, the problem of finding out the source IP addresses of a multicast group is inexistent because it is the user who chooses the sources from which he wishes to receive multicast traffic. Therefore, hosts are able to indicate source IP addresses to the router or to the proxy. As a result, it is possible in SSM to eliminate a number of technical complexities which are characteristic of ASM. In particular, it is possible to eliminate the technical complexities which are associated to finding out source IP addresses. For example, in SSM it is not necessary to use an RP router because routers can know the source IP addresses, which are indicated by the hosts when they subscribe to the multicast group. Therefore, in SSM it is possible to apply more efficient algorithms than those which are used today.

The previously mentioned rules for the IGMPv3 protocol prevent being able to exploit these advantages of the SSM system. When a network interface works in EXCLUDE mode it does not know the source IP addresses and is therefore forced to find out said IP addresses through the RP router, as previously explained for the ASM, with the drawback that the routing processes for ASM are more complicated.

The IETF has recently published a new proposal which modifies the IGMPv3 and MLDv2 version specifications of the IGMP and MDL protocols in order to try to solve the mentioned drawbacks and which is described in the RFC 4604 specifications published on line by the IETF (H. Holbrook et al., Engineering Task Force, Network Working Group, Request for Comments 4604, August 2006; currently available at Internet address http://tools.ietf.org/html/rfc4604). The proposed modification basically consists of reserving a range for SSM multicast addresses and prohibiting the hosts in an SSM multicast system from sending EXCLUDE messages. This restriction unnecessarily penalizes the full development of SSM, because it prevents a host from being able to listen for other new sources within the same multicast group.

A number of patents or patent applications are known which propose different improvements in multicast communications. The following should be pointed out: U.S. Pat. No. 6,434,622B1, U.S. Pat. No. 6,785,294B1, U.S. Pat. No. 6,977,891 B1, US2003/0067917A1, US2005/0207354A1, US2006/0120368, US2006/0182109A1 and WO2006/001803A1. However, none of them solves the aforementioned problems.

SUMMARY OF THE INVENTION

The main purpose of the invention is to provide an improved system of managing multicast communications in a data network, especially applied to SSM communications.

An object of the invention is to increase the routing efficiency between data sending sources and hosts that have requested to receive said data sendings.

Another object of the invention is that it can be implemented in the form of an improved multicast host-router communication protocol using existing protocols as a basis and in a manner that is compatible with earlier versions of these protocols.

For this purpose, a method for managing multicast traffic in a data network of the type indicated at the beginning has been developed, characterized in that according to said communications protocol allowing multicast host-router communications:

the hosts store, for each multicast group and network interface, two separate records: an included source record containing an included source list and an excluded source record containing an excluded source list;

the network interface of each host sends to said router a message containing, for a single multicast group, information of the source list of the included source record of said host and/or information of the source list of the excluded source record of said host;

the router stores, for each multicast group, two separate records: an included source record containing information of the included source lists and an excluded source record containing information of the excluded source lists;

said router updates its included source record and/or its excluded source record, for each multicast group, when it receives through its network interface a message from the hosts containing information about an included source list and/or information about an excluded source list.

The invention contemplates that said message which the network interface of each host sends to said router is a state message containing the source list of the included source record of said host and the source list of the excluded source record of said host.

The invention also contemplates that said message which the network interface of each host sends to said router is a change of state message which is sent when said host detects a variation in its included source record or a variation in its excluded source record, said change of state message comprising one or two data blocks for each multicast group, in which each of said data blocks contains information about modifications of the source list of the included source record or information about modifications of the source list of the excluded source record, and in which each of said data blocks contains a field indicating if the data block relates to modifications of the included source list or to modifications of the excluded source list.

The router advantageously uses the information of the included source lists contained in said messages that it has received to request the data traffic sent by said included sources.

When the network interface is a network interface of a host, for each socket using said network interface and each multicast group an included source record and an excluded source record are kept, and an included source record and an excluded source record are kept for said network interface, which are updated, respectively, based on the content of said included source records for the sockets and based on said excluded source records for the sockets.

In an advantageous embodiment, said state messages reaching the network interface of the router contain instructions about the method which said router must apply to set up routing trees from said included sources to said router. Preferably, to incorporate said instructions in a state message, said state message indicates a multicast address which is outside the range reserved for multicast addresses; the router detects that the indicated multicast address is out of range, interprets that said multicast address contains said instructions and reads said instructions in the form of a numeric code contained in said multicast address.

The communications protocol between the router and the hosts is preferably a version of the IGMP protocol (Internet Group Management Protocol) or of the MLD (Multicast Listener Discovery) protocol in which the state messages sent by a network interface or by an equipment interface can contain, in the same message, an included source list and an excluded source list.

The invention also relates to network equipment compatible with the method according to the invention, said network equipment comprising a network interface and being suitable to operate in the exchange line between said host and said router, characterized in that it stores executable instructions for:

keeping, for each multicast group, an included source record and an excluded source record;

sending, to a nearby network interface towards said router, a message containing, for a multicast group, information of the source list of said included source record and/or information of the source list of said excluded source record; and updating said included source record and/or said excluded source record, for each multicast group, when the network interface of said network equipment receives a message from another network interface containing information about an included source list and/or information about an excluded source list.

The invention also relates to equipment compatible with the method according to the invention, said equipment comprising a network interface and being suitable to operate as a host, characterized in that it stores executable instructions for keeping, for each socket using said network interface and for each multicast group, an included source record and an excluded source record, and keeping for said network interface an included source record and an excluded source record which are updated, respectively, based on the content of said included source records for the sockets and based on said excluded source records for the sockets.

The invention also relates to a router compatible with the method according to the invention, characterized in that it stores executable instructions for:

keeping, for each multicast group, two separate records: an included source record and an excluded source record; and updating said included source record and/or said excluded source record, for each multicast group, when said router receives, through its network interface, a message containing information about an included source list and/or information about an excluded source list.

Said router preferably uses the information of the included source lists comprised in said messages received by the router to request from other routers the data traffic sent by said included sources.

To request said data traffic sent by said included sources, said router preferably uses the PIM-SM (Protocol Independent Multicast—Sparse Mode) protocol.

In a preferred embodiment, upon receiving a message informing that a host no longer wishes to receive traffic from a specific multicast group and a specific included source, said router checks if there is an excluded source record of said multicast group and if said record exists and does not contain an excluded source with the same IP address as said included source, said router continues transmitting said traffic of said specific multicast group and said specific included source, without sending a Group-And-Source Specific Query type message in the IGMP protocol to check if there is another host that still wishes to receive said traffic.

Also in a preferred embodiment, upon receiving a message to update the information of the excluded source record, in which said message requests blocking traffic from a specific source and multicast group, said router checks if there is an included source record of said multicast group and if said record exists and contains an included source with the same IP address as the source for which said message has requested a block, said router continues transmitting said traffic of said specific multicast group and said specific source, without sending a Group-And-Source Specific Query type message in the IGMP protocol to check if there is another host that still wishes to receive said traffic.

BRIEF DESCRIPTION OF THE DRAWINGS

Other advantages and features of the invention can be seen in the following description in which, with a non-limiting character, preferred embodiments of the invention are referred to in relation to the attached drawings. In the figures:

FIG. 3 shows the format of the Membership Query messages sent by the routers to the hosts in the IGMPv3 protocol, both in the IGMPv3 protocol and in the modified IGMP protocol according to the invention;

DETAILED DESCRIPTION OF EMBODIMENTS OF THE INVENTION

Figure 1:
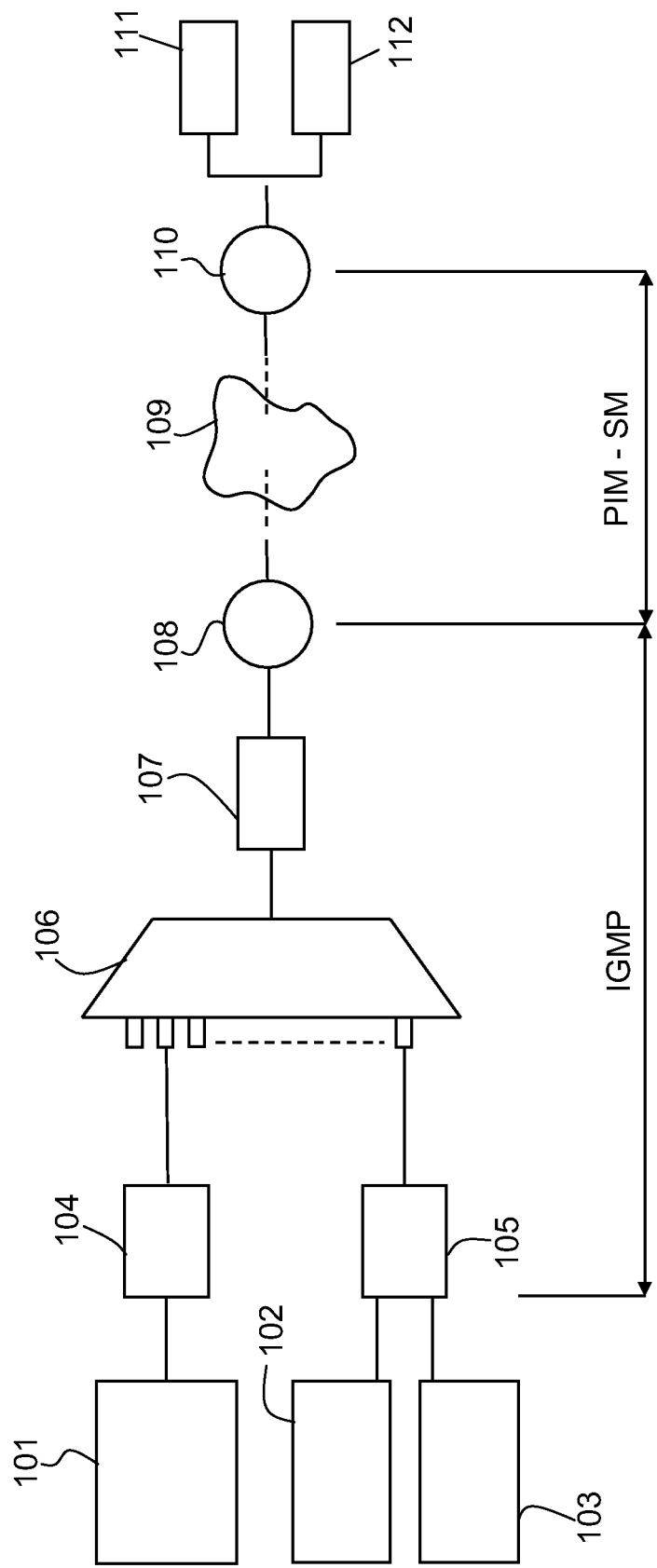
FIG. 1 shows a basic example of a multicast system in a data network.

FIG. 1 shows a basic example of a multicast system in a data network. In this example, three hosts 101, 102, 103 are connected to the data network through CPEs 104, 105 (CPE: Customer-Premises Equipment). A CPE is a terminal for connecting to the network that is located on the subscriber access line side, which communicates for example by means of a DSL (Digital Subscriber Line) modem. The host 101 is connected to a CPE 104 of a subscriber line, whereas both hosts 102 and 103 are connected to another CPE 105 of another subscriber line. CPEs 104, 105 are connected to a DSLAM 106 (DSLAM: Digital Subscriber Line Access Multiplexer) which directs traffic from the different CPEs 104, 105 through a switch 107 to a router 108 which is in turn connected to an IP (Internet Protocol) network 109. Another router 110 is connected at another point of the IP network 109, which router concentrates the data packets sent by several sources 111, 112 of a multicast group.

For clarity's sake, FIG. 1 shows a single group formed by several hosts 101, 102, 103 connected to a router 108, and a single group of sources 111, 112 connected to a router 110. Of course, a multicast system is in reality made up of a large number of these assemblies and groups.

FIG. 1 also shows the scope of each of the IGMP and PIM-SM protocols: the IGMP protocol is applied to communications between the receiving hosts and the routers, through the CPEs and the DSLAMs, whereas the PIM-SM protocol is applied to communications between different routers through the IP network.

It has been assumed in this example that the routers operate with the IPv4 version of the IP protocol and therefore the system uses the IGMP protocol. However, the reasons set forth are also applied to a system using the MLD protocol (version IPv6 of the IP protocol).

The CPEs and the DSLAMs are equipment that can carry out an IGMP proxy function consisting of receiving several IGMP requests and assembling them to reduce the volume of IGMP messages which are sent to the router. This operation is described in the RFC 4605 specifications of the IETF mentioned at the beginning.

The basic operation of the multicast system shown in FIG. 1 is as follows.

The hosts 101, 102, 103 send the CPEs 104, 105 several IGMP messages in which they identify the multicast address of the group and the source addresses from which they wish to receive data sending. The CPEs receiving several IGMP messages from different hosts, as is the case of the CPE 105 in the example of FIG. 1, assemble these IGMP messages to send the DSLAM a single IGMP message. For its part, the DSLAM 106 receives IGMP messages from different CPEs, in this case CPEs 104, 105, and assembles them to send to the router 108, through switch 107, an IGMP message in which only the INCLUDE or EXCLUDE sources are indicated for each multicast group.

The router 108 receives the IGMP message sent by DSLAM 106 through switch 107, and communicates with other IP network routers using the PIM-SM protocol for setting up routing through the IP network making the data sent by the sources specified in the IGMP message received by the router 108 reach the router 108.

As will be seen below in a more detailed example, in the prior art the router 108 does not always know the source IP addresses that had been specified by the hosts because this information has been lost when network interfaces assembled the IGMP messages originally sent by the hosts. The router 108 must therefore find out the source IP addresses by applying complicated and rather inefficient processes.

Operating example of a multicast system applying the methods of the prior art (IGMPv3 protocol)

Figure 2:
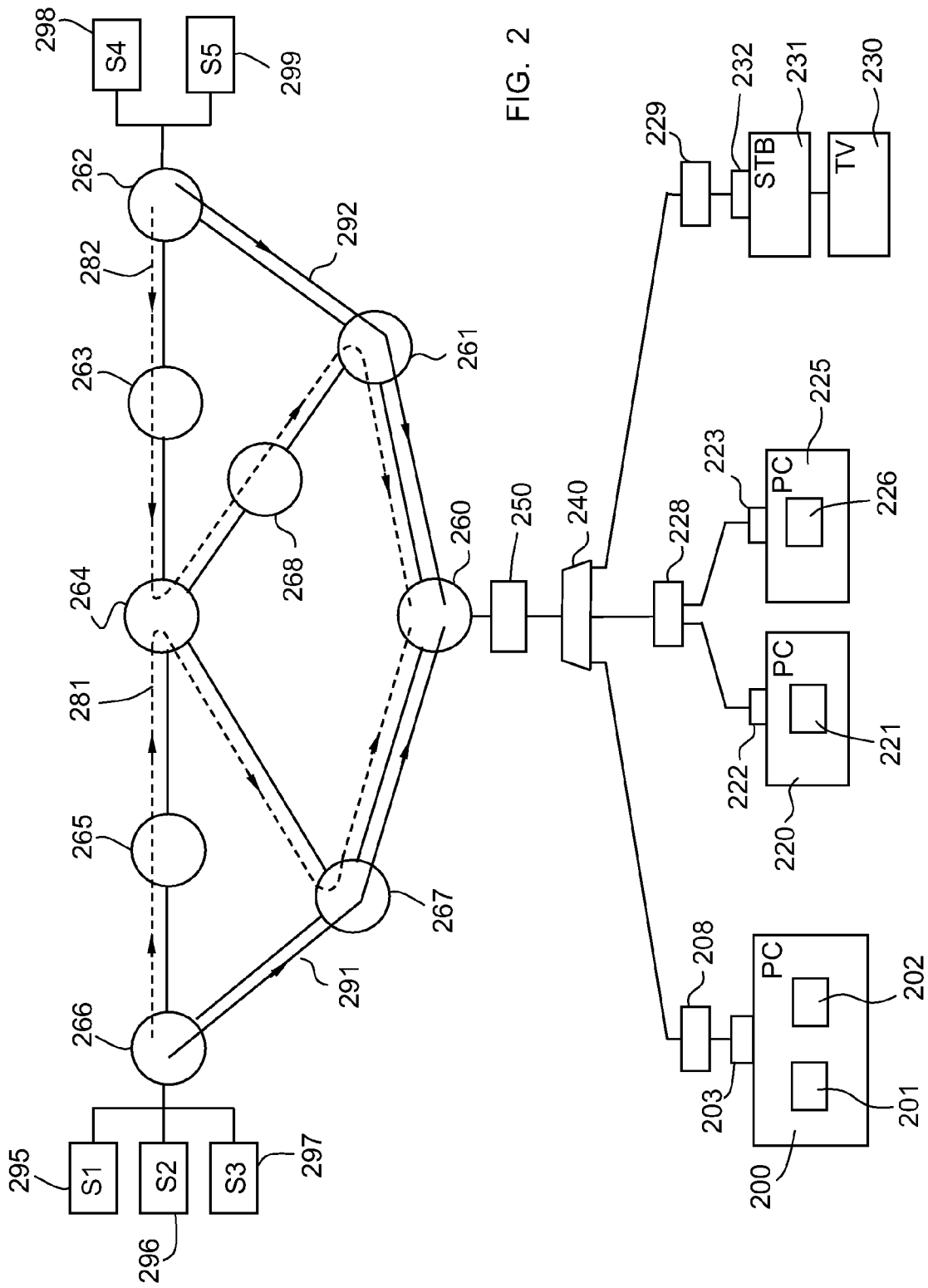
FIG. 2 shows a more detailed example of a multicast system in a data network.

FIG. 2 shows in greater detail a multicast system and the different communications necessary for it to operate.

For the purpose of demonstrating the principles and advantages of the invention based on the diagram of FIG. 2, the operation according to the prior art, which applies IGMPv3 protocol, is first explained. Then reference to this same diagram of FIG. 2 will be made to explain the operation according to the invention.

The host 200 is a personal computer PC in which two applications 201, 202 that can request multicast traffic are executed. The computer 200 is equipped with a network card 203 which is connected to a CPE 208, which is in turn connected to a DSLAM 240.

The hosts 220 and 225 are two personal computers PC which are each equipped with a network card 222, 223 connected to a single CPE 228, which is in turn connected to the DSLAM 240. A single application, respectively 221, 226, that can request multicast traffic is executed in each computer 220, 225.

The host 231 is an STB (Set-Top-Box) decoder, connected to a television set 230, which allows receiving television channels via Internet. The decoder 231 is equipped with a network card 232 connected to a CPE 229 which is in turn connected to the DSLAM 240.

The DSLAM 240 is connected to the router 260 through the switch 250. The router 260 is connected to an IP network formed by other routers, which in this example are routers 261, 262, 263, 264, 265, 266, 267 and 268.

Router 264 is an RP (Rendez-vous Point) router, i.e. a router used by the PIM-SM protocol to set up the routing between the sending sources of the multicast group and the hosts that wish to receive the sendings from these sources when they do not know the IP addresses of the latter.

In the example of FIG. 2 there are five sending sources 295, 296, 297, 298, 299 belonging to a single multicast group G1. For a simplified explanation, the following description refers to these sources through their respective IP addresses, which are respectively S1, S2, S3, S4 and S5, as indicated in FIG. 2.

Sources S1, S2 and S3 are connected to the IP network through router 266, whereas sources S4 and S5 are connected through router 262.

The applications 201 and 202 which are executed in the host 200 wish to receive the data sendings in the multicast group G1, but each application wishes to receive sendings from different sources:

application 201 wishes to receive the sendings from sources S1 and S2, and to that end it will make an INCLUDE({S1, S2}; G1) type request;

application 202 wishes to receive the sendings from all the sources except S4, and to that end it will make an EXCLUDE({S4}; G1) type request.

The network card 203 is a network interface which must combine the state of the different sockets associated to the applications 201 and 202 applying the IGMPv3 protocol rules. Since one of the sockets operates in EXCLUDE mode, the network interface 203 will operate only in EXCLUDE mode and will send CPE 208 the following message: EXCLUDE({S4}; G1).

In theory it seems that sending an EXCLUDE({S4}; G1) message makes it unnecessary to send an INCLUDE({S1, S2}; G1) message, because the first message implicitly includes all the sources except S4 and it therefore includes sources S1 and S2. However, by operating in this manner valuable information that was contained in the IGMP message sent by application 201 has been lost: the IP addresses of sources S1 and S2.

The EXCLUDE({S4}; G1) message sent by the network card 203 is transmitted to DSLAM 240, without the information of the sources being modified by CPE 208 since it only receives IGMP messages from one origin.

The application 221 which is executed in the computer 220 makes an INCLUDE({S5}, G1) type request, indicating that it wishes to receive the sending from source S5. The network card 222 does not have to combine several requests because it only receives requests from the socket the application 221 is associated to. Therefore, the network card 222 sends the CPE 228 an IGMP message containing the same information as the request of application 221, i.e. an INCLUDE({S5}, G1) message.

The application 226 which is executed in the computer 225 makes an INCLUDE({S3}, G1) type request, indicating that it wishes to receive the sending from source S3. The network card 223 does not have to combine several requests because it only receives requests from the socket the application 226 is associated to. Therefore, the network card 223 sends the CPE 228 an IGMP message containing the same information as the request of application 226, i.e. an INCLUDE ({S3}, G1) message.

The CPE 228 acts as an IGMP proxy, applying the IGMPv3 protocol rules to combine the messages sent by the network interfaces 222 and 223, respectively. Since all the received messages are INCLUDE type messages, the network interface 228 will operate only in INCLUDE mode and will transmit to DSLAM 240 the following message: INCLUDE ({S3, S5}; G1).

The STB 231 sends the INCLUDE({S1}, G1) message, indicating that it wishes to receive the sending from source S1. The CPE 229 transmits this message intact to the DSLAM 240, since it receives IGMP messages from a single origin.

The DSLAM 240 therefore receives the three following IGMP messages:

EXCLUDE({S4}; G1), from CPE 208
INCLUDE ({S3, S5}; G1), from CPE 228
INCLUDE({S1}, G1), from CPE 229

DSLAM 240 is a proxy which must combine these different messages applying the IGMPv3 protocol rules. Since one of the received messages, relating to the multicast group G1, is an EXCLUDE type message, the network interface 240 will operate only in EXCLUDE mode for said multicast group G1 and will transmit to the router 260, through the switch 250, the following message: EXCLUDE({S4}; G1), indicating that the router 260 must transmit to the DSLAM 240 the sendings from all the sources of the group G1, except S4.

The router 260 then communicates with the other IP network routers using the PIM-SM protocol to receive the data sent by the sources requested in the IGMP message, which are all the sources of the multicast group G1 except source S4. The PIM-SM protocol is a complex protocol which allows setting up two types of routing trees: an RPT (Rendez-vous Point Tree) tree, having its center in the RP router (which in this case is router 264) and an SPT (Shortest Path Tree), which sets up the shortest path. The RP router is a router designated by the PIM-SM protocol as the router in charge of knowing the IP addresses of all the sources of a multicast group. The router 260 initially always receives the traffic from the multicast group through the RPT tree, because only the RP router knows the source IP addresses. When certain conditions that will be explained below are met, the router 260 then uses the SPT tree and abandons transmission through the RP tree.

In the example of FIG. 2, upon initially using the RPT tree the router 260 receives the sendings from sources S1, S2 and S3 through the path 281 indicated with a dotted line, and it receives the sending from source S5 through the path 282 indicated with a dotted line. The router 260 is therefore receiving the data through the longest paths instead of through the shortest paths according to the SPT trees, which are paths 291 and 292 indicated with a solid line.

The router 260 does not know the IP addresses of the included sources because it has only received from DSLAM 240 an EXCLUDE ({S4}; G1) message. Therefore, the router 260 cannot request the traffic from the included sources directly using SPT trees. As stated at the beginning, this is a serious drawback. Another drawback consists of the fact that if the router operates only in SSM multicast, it will not accept the EXCLUDE message. Furthermore, if the router is a simplified router that is only able to directly connect with the sources, it cannot do so if it does not know the IP addresses thereof.

The conditions provided by the PIM-SM protocol for switching from the RPT tree to an SPT tree for a specific channel (S, G), i.e. the channel defined by source S in the multicast group G, are detailed in the RFC 4601 specifications, specifically in section 4.2.1 called "Last Hop Switchover to the SPT" which defines a function referred to as CheckSwitchToSpt(S,G):

```
void
CheckSwitchToSpt(S,G) {
if ((pim_include(*,G) (-) pim exclude(S,G)
    (+) pim_include(S,G) !=NULL
AND SwitchToSptDesired(S,G)) {
    # Note: Restarting the KAT will result in
    # the SPT switch set KeepaliveTimer(S,G) to
    # Keepalive_Period
```

}
}
}

The CheckSwitchToSpt(S,G) function has a configurable part, defined by the configurable "SwitchToSptDesired(S,G)" function, and a non-configurable part. Switching from the RPT tree to the SPT tree is carried out when both parts of the conditions are met.

Normally the configurable "SwitchToSptDesired(S,G)" function is used to establish a threshold of the volume of traffic from the source S, such that switching from the RPT tree to the SPT tree is not carried out if said threshold has not been exceeded.

The non-configurable part, which forms part of the PIM-SM protocol programming code, is as follows:

(pim_include(*,G) (−) pim exclude(S,G)(+) pim_include(S,G) !=NULL)

This non-configurable condition provides that a router only switches from the RPT tree to the SPT tree for a specific channel (S,G) if there is a network interface of the router which has received an INCLUDE (S,G) IGMP message or if there is a network interface of the router which has received an IGMP-type message which indicates that it wishes to receive traffic from all the sources of the group G and said network interface has not received an EXCLUDE (S,G) IGMP message. Since this non-configurable condition only relates to IGMP messages, the only router which can initiate a switch to the SPT tree to set up a direct connection with the input router of the channel (S, G) is the router receiving the IGMP messages, i.e. router 260 in the example of FIG. 2. In routers which do not receive IGMP messages directly through their network interfaces, this condition will never be met, such that these routers will never initiate a switch to the SPT tree.

In the example of FIG. 2, the only message which the router 260 receives is EXCLUDE({S4},G1), whereby said non-configurable condition is not met. Accordingly, the router 260 cannot switch from the RPT tree to the SPT tree and the traffic will initially pass through the longest paths 281, 282 through the RP router 264, rather than doing so through the shortest paths 291, 292. The traffic is thus distributed in a rather inefficient manner and the RP router is unnecessarily overloaded.

In summary, this example shows that the application of the IGMPv3 protocol rules to combine INCLUDE and EXCLUDE type messages negatively affects the routing system efficiency. A person skilled in the art will easily understand that this situation also occurs in other multicast systems with different combinations from those that are shown in FIG. 2.

Modified IGMP Protocol According to the Invention

The invention solves these problems by applying a modified IGMP protocol so that the network interfaces can transmit the messages sent by the hosts without losing the information contained in said messages.

The modified IGMP protocol according to the invention differs from the IGMPv3 protocol in that the network interfaces can operate in dual mode: they separately store and transmit the information contained in the INCLUDE type IGMP messages and the information contained in the EXCLUDE type IGMP messages.

The modified IGMP protocol according to the invention is described below. To facilitate the explanation, reference is made to the description of the IGMPv3 protocol according to the RFC 3376 specifications of the IETF mentioned at the beginning, and only the changes in the modified IGMP protocol with respect to said IGMPv3 protocol are described in detail. The parts which are not described in detail may adapt to the IGMPv3 protocol and therefore are within reach of a person skilled in the art.

The description is organized in the following sections:

1) Description of the Interface. State information. Way of assembling sources.

2) Way of deleting a state record.

3) Rules for deriving network interface records.

4) Description of IGMP messages.

5) Behavior when the information of a record changes.

6) Behavior when a host receives a Membership Query message.

7) Description of the protocol for the routers.

8) Compatibility with an IGMPv3 host

9) Improved IGMP proxy

1) Description of the Interface. State Information. Way of Assembling Sources.

The RFC 3376 specifications of the IGMPv3 protocol explain that systems must support IGMP messages according to the following function, allowing a host to choose the multicast data sources:

IPMulticastListen (socket, interface, multicast-address, filter-mode, {source-list}) where:

"socket" is a parameter which allows distinguishing the different applications executed in the system and which call the IPMulticastListen function. For example, they can be different applications executed in a single computer connected to the data network.

"interface" is a local identifier of the network card or network interface in which the multicast data sources which are to be received are indicated.

"multicast-address" is the address of the multicast group.

"filter-mode" is the network interface mode, which can be INCLUDE or EXCLUDE. In the INCLUDE mode, the network interface defines the source-list as INCLUDE; this means that the traffic sent by all the sources on the list must be sent. In the EXCLUDE mode, the network interface defines the source-list as EXCLUDE; this means that the traffic from all the sources sending in the multicast group must be sent except the sources on the list.

"source-list" is the INCLUDE or EXCLUDE source list.

The RFC 3376 specifications clearly explain that for a specific socket, network interface and multicast group combination, there can only be one filter-mode, which can be INCLUDE or EXCLUDE.

The system saves a state record for each active socket. This record contains the following information:

(interface, multicast-address, filter-mode, {source-list})

For each socket, the filter-mode of the record can only be INCLUDE or EXCLUDE.

The system also saves a record for each network interface. This record contains the following information:

(multicast-address, filter-mode, {source-list})

For each network interface and multicast group, the filter-mode of the record can only be INCLUDE or EXCLUDE. The records of each network interface are derived from the socket records. When the record of a network interface must result from the combination of different records, the rules explained at the beginning and transcribed below are applied:

Rule 1. If any of the data sources of a group G1 is EXCLUDE, then the network interface will have an EXCLUDE filter-mode for the group G1 and the source list of the network interface is the intersection of the EXCLUDE source lists minus the sources of the INCLUDE lists.

Rule 2. If all the sources are INCLUDE type sources, then the network interface will have an INCLUDE filter-mode for the group G1 and the source list is the union of all the INCLUDE sources.

The characteristics of the IGMPv3 protocol according to the RFC 3376 specifications have been described up to this point.

The modified IGMP protocol according to the invention preferably maintains the same structure of the IPMulticastListen function of the IGMPv3 protocol:

IPMulticastListen (socket, interface, multicast-address, filter-mode, {source-list})

but with the difference that for each socket and each network interface the system saves two records: one for the EXCLUDE filter-mode and another one for the INCLUDE filter-mode.

The system therefore saves two records for each socket:

INCLUDE record: (interface, multicast-address, INCLUDE, {source-list})

EXCLUDE record: (interface, multicast-address, EXCLUDE, {source-list})

and two records for each network interface and multicast group:

INCLUDE record: (multicast-address, INCLUDE, {source-list})

EXCLUDE record: (multicast-address, EXCLUDE, {source-list})

As long as there are only INCLUDE sources or there are only EXCLUDE sources, the system only needs one record. However, if there are different calls to the IPMulticastListen function for the same multicast group with INCLUDE and EXCLUDE source information, then the system stores the information in two records, rather than mixing the information as occurs in the prior art with the IGMPv3 protocol.

Each call to the IPMulticastListen function replaces the content of the record for a specific multicast group, and if there is no record, it creates one (this occurs, for example, when calling the function for said multicast group for the first time).

2) Way of Deleting a Record

To delete a record of a specific group G1 in the IGMPv3 protocol, an INCLUDE type message is sent with an empty source list: INCLUDE ({ }, G1). In addition, a record in EXCLUDE mode of a specific group G1 switches to the INCLUDE mode automatically after a certain time has passed without needing to send any message. To that end, records in the IGMPv3 protocol have a timer for each multicast group which is different from zero if the record state is EXCLUDE. When the timer reaches zero the record switches from the EXCLUDE mode to the INCLUDE mode.

To delete an INCLUDE record of a specific group G1 in the modified IGMP protocol according to the invention, the same system is used as in the IGMPv3 protocol: an INCLUDE type message is sent with an empty source list: INCLUDE ({ }).

To automatically delete an EXCLUDE record of a specific group G1, in the modified IGMP protocol EXCLUDE records also have a timer for each multicast group, as in the IGMPv3 protocol, but the operation is simpler because it is not necessary to switch from the INCLUDE mode to the EXCLUDE mode: when the timer reaches zero the EXCLUDE record is simply deleted.

The modified IGMP system optionally adds a new system for deleting EXCLUDE state records more quickly which is applied to:

host records, which are updated with the IPMulticastListen function;

proxy and router records, which are updated by means of IGMP messages.

A new filter-mode parameter referred to as Filter_Delete_Exclude has been incorporated in the modified IGMP protocol to delete EXCLUDE records by means of the IPMulticastListen function. When the IPMulticastListen function receives a call with this parameter, it knows that it must delete the EXCLUDE record from the multicast group indicated in the multicast-address.

To delete EXCLUDE records from proxies and routers by means of IGMP messages, a new value for the Group Record Type field of the Membership Report messages has been defined in the modified IGMP protocol with the following abridged description:

7 DELEX—Type MODE_IS_DELETE_EXCLUDE

This new value is added to the values 1 to 6 of the Group Record Type field already existing in the IGMPv3 protocol with the following abridged descriptions (section 4.2.12 of the RFC 3376 specifications):

1 IS_IN (x)—Type MODE_IS_INCLUDE

2 IS_EX (x)—Type MODE_IS_EXCLUDE

3 TO_IN (x)—Type CHANGE_TO_INCLUDE_MODE

4 TO_EX (x)—Type CHANGE_TO_EXCLUDE_MODE

5 ALLOW (x)—Type ALLOW_NEW_SOURCES

6 BLOCK (x)—Type BLOCK_OLD_SOURCES where x is the list of source IP addresses.

3) Rules for Deriving the Network Interface Records

As indicated in section 1), the modified IGMP protocol allows saving two records for each network interface and multicast group:

INCLUDE record: (multicast-address, INCLUDE, {source-list})

EXCLUDE record: (multicast-address, EXCLUDE, {source-list})

where multicast-address is the address of the multicast group and source-list is the source list.

As in the IGMPv3 protocol, the network interface records are derived from socket records. However, upon applying the modified IGMP protocol the process is much simpler because it is not necessary to mix the INCLUDE sources and the EXCLUDE sources of a single multicast group.

The modified IGMP protocol applies the following rules for each network interface and multicast group:

Rule 1. For each multicast group, each INCLUDE record of the network interface contains the union of all the sources of the INCLUDE records of the sockets using said network interface.

Rule 2. For each multicast group, each EXCLUDE record of the network interface contains the intersection of the sources of the EXCLUDE records of the sockets using said network interface.

4) Description of IGMP Messages

To simplify the explanation, IGMP messages between the router and a host are described in this section assuming that there is no IGMP proxy between them. The behavior of an IGMP proxy will be described below in section 9.

For the communication between a host and a router, the modified IGMP protocol uses the same messages as the IGMPv3 protocol, described in section 4 of the RFC 3376 specifications, but with the modifications explained below.

FIG. 3 shows the format of the messages sent by the routers to the hosts in the IGMPv3 protocol. These messages are referred to as Membership Query messages. The format shown in FIG. 3 is applied to both the IGMPv3 protocol and to the modified IGMP protocol.

Figure 4:
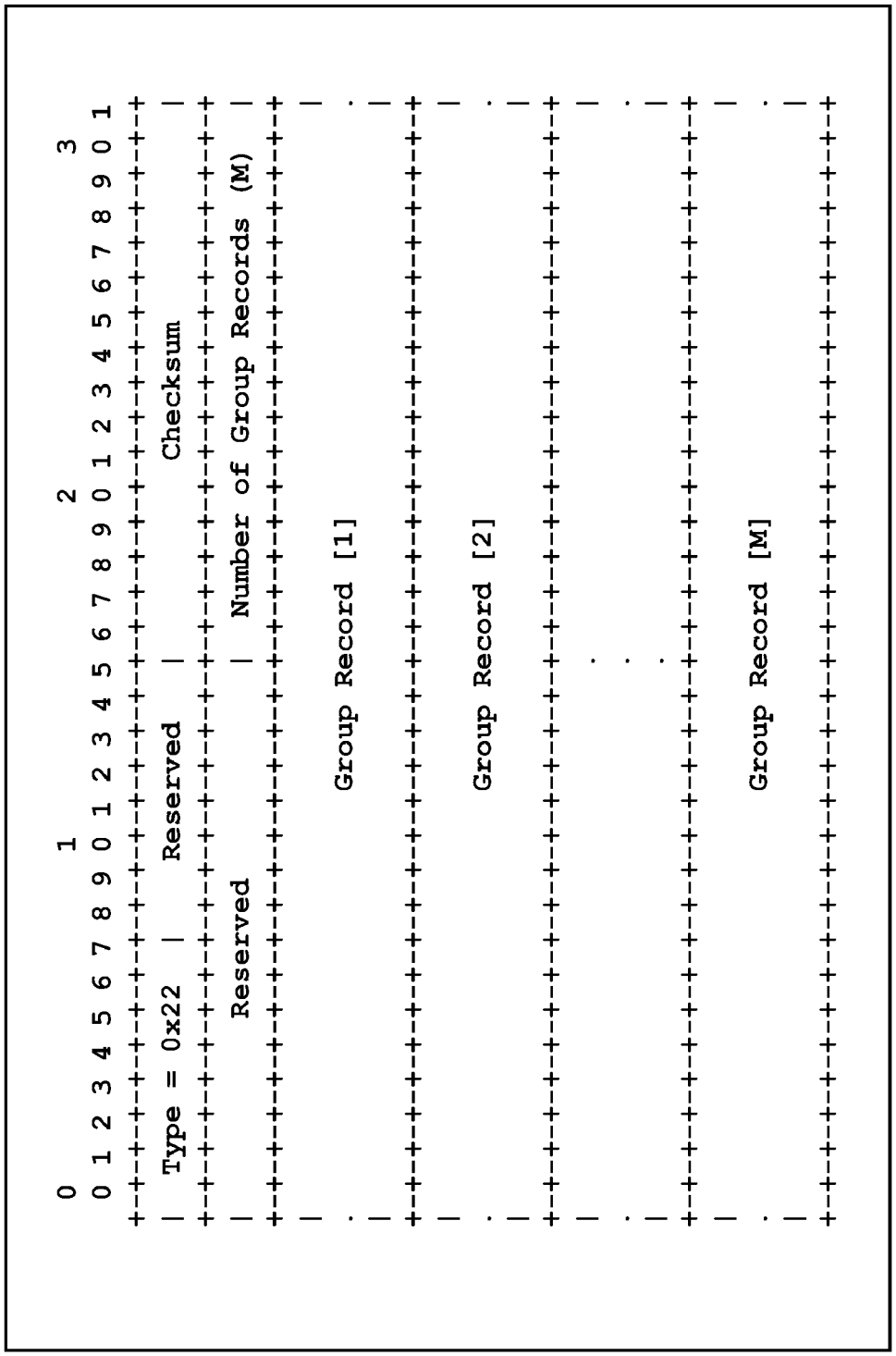
FIG. 4 shows the format of the Membership Report messages sent by the hosts to the routers, both in the IGMPv3 protocol and in the modified IGMP protocol according to the invention.

FIG. 4 shows the format of the messages sent by the hosts to the routers in the IGMPv3 protocol. These messages are referred to as Membership Report messages. The format shown in FIG. 4 is applied to both the IGMPv3 protocol and to the modified IGMP protocol.

Figure 5:
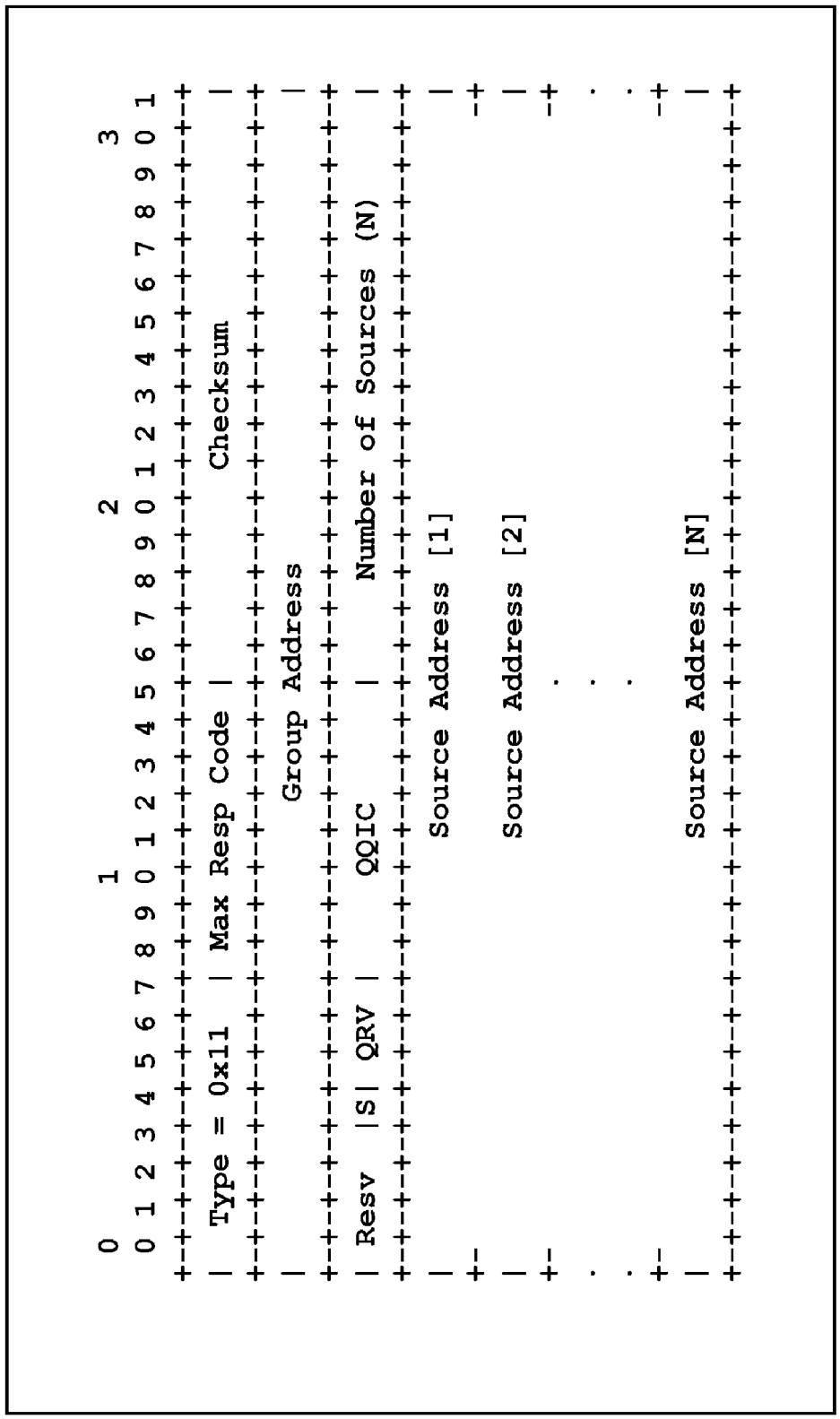
FIG. 5 shows the inner format of the Group Record data blocks contained in each Membership Query or Membership Report message in the IGMPv3 protocol.

FIG. 5 shows the inner format of the data blocks referred to as Group Record which are contained in each Membership Report message. The Group Address field contains the multicast group address. The Source Address fields contain information about the sources. The Number of Sources field indicates the number of Source Address fields existing in each Group Record. The format shown in FIG. 5 is applied to the IGMPv3 protocol.

Figure 6:
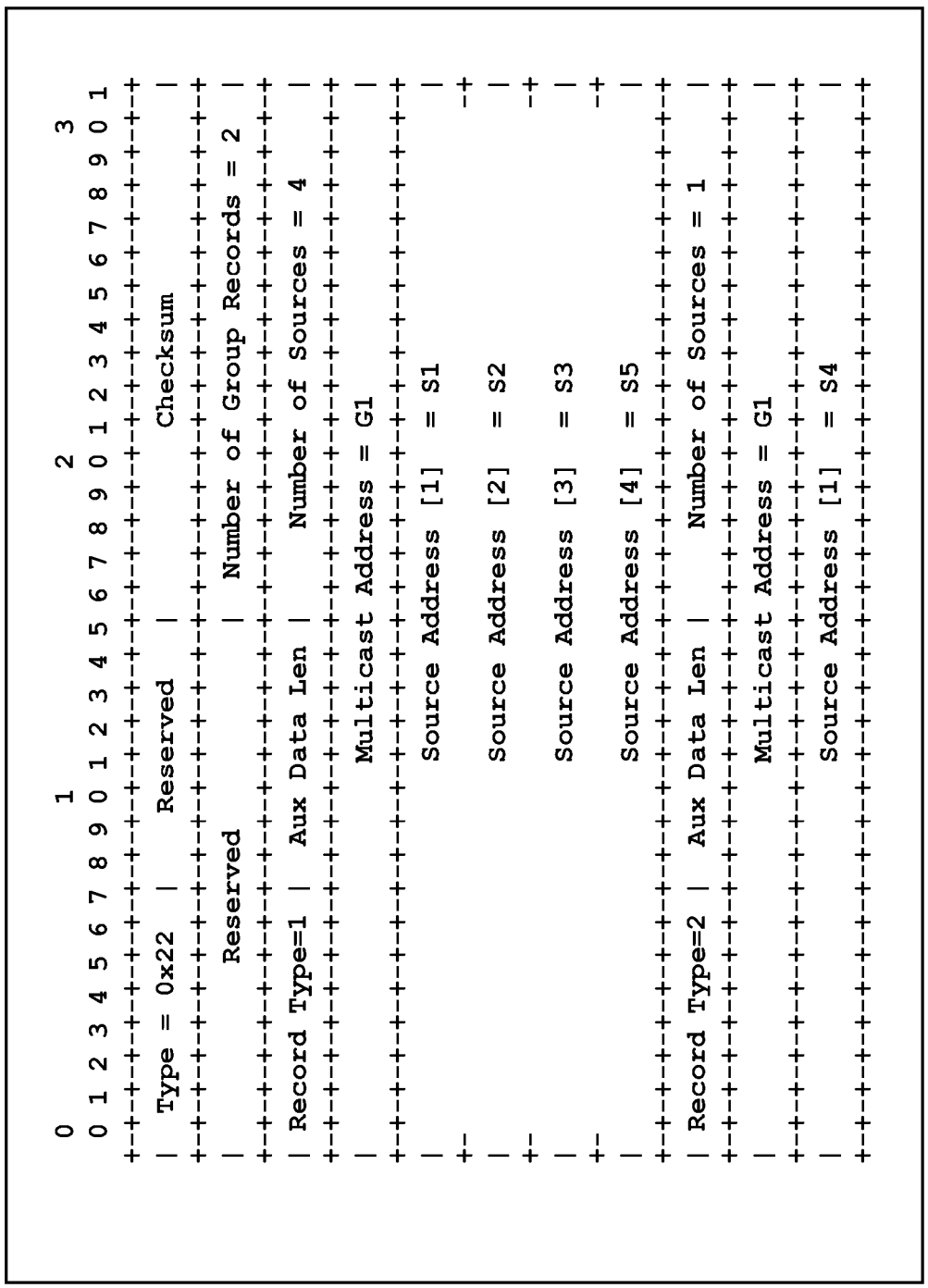
FIG. 6 shows the format of a Membership Report message corresponding to the message sent by DSLAM 240 to router 260 in the system of FIG. 2, when the modified IGMP protocol according to the invention is applied.

In the modified IGMP protocol, when a Membership Report type message is sent the same message format is used as in the IGMPv3 protocol, but when there are INCLUDE sources and also EXCLUDE sources for the same multicast group, two Group Records are sent, as can be seen in FIG. 6, which will be discussed below. Since the sources are not mixed and there can be two records for each network interface and multicast group, the system can transmit a message with two different Group Records for a single multicast address or group: one of the Group Records transmits the information about the INCLUDE sources and the other one transmits the information about the EXCLUDE sources.

In the IGMPv3 protocol the routers send a General Query type Membership Query message to ask the hosts about their state. In response to this message, the hosts send a Current-State Record type Membership Report state message. This system is maintained in the modified IGMP protocol, but the Current-State Record message sent by the host can contain two Group Records for a single multicast group: one in INCLUDE mode and the other one in EXCLUDE mode. The INCLUDE or EXCLUDE mode is identified, as in the IGMPv3 protocol, by the content of the Record Type field, respectively:

Record Type=1=MODE_IS_INCLUDE

Record Type=2=MODE_IS_EXCLUDE

The information about the two records is thus transmitted in a single Current-State Record message.

In the IGMPv3 protocol, the hosts send Source-List-Change Record messages to report the changes that there have been in the INCLUDE and EXCLUDE sources. Unlike Current-State Record messages, Source-List-Change Record messages are not sent in response to a Membership Query message sent by the router, but rather they are sent by a host to indicate that a change in its source record has occurred.

As in the IGMPv3 protocol, in the modified IGMP protocol the hosts also send Source-List-Change Record messages, but with the following difference: since there can be two different records for a single multicast group (an INCLUDE record and an EXCLUDE record), the Source-List-Change Record message must indicate which of the two records it refers to. To that end, four new Group Record Types are defined in the modified IGMP protocol, with the following abridged expressions:

8 ALLOWIN (x)—Type ALLOW_NEW_SOURCES_INCLUDE

9 BLOCKIN (x)—Type BLOCK_OLD_SOURCES_INCLUDE

10 ALLOWEX (x)—Type ALLOW_NEW_SOURCES_EXCLUDE

11 BLOCKEX (x)—Type BLOCK_OLD_SOURCES_EXCLUDE where x is the list of source IP addresses.

The new Group Record Type 8 and 9, i.e. the ALLOWIN (x) and BLOCKIN (x) expressions, are used to send messages adding or removing, respectively, elements to or from the source lists in the INCLUDE records.

The new Group Record Type 10 and 11, i.e. the ALLOWEX (x) and BLOCKEX (x) expressions, are used to send messages so that it allows or blocks, respectively, the traffic sent by the source x.

FIG. 6 shows an example of a Membership Report message corresponding to the message sent by the DSLAM 240 to the router 260 in the diagram of FIG. 2 when the modified IGMP protocol according to the invention is applied. The content of this message will be described below in detail. The DSLAM 240 acts as an IGMP proxy located between the router 260 and the hosts 200, 220, 225 and 231. Therefore, in this case the preceding explanation about IGMP messages between a router and a host applies, replacing said host with the DSLAM 240. An IGMP proxy acts as a host in its communications with an IGMP Router and acts as an IGMP router in its communications with a host.

The record stored in each equipment of FIG. 2 when the modified IGMP protocol according to the invention is applied is indicated below.

In PC 200, if applications 201 and 202 use respectively socket1 and socket2, socket1 and socket2 state records, respectively, are the following:

INCLUDE record: (Interface 203, Group G1, INCLUDE, {S1, S2})

EXCLUDE record: (Interface 203, Group G1, EXCLUDE, {S4})

The state record of the network interface 203 of the PC 200, coinciding with the state of the network interface of the CPE 208, is the following:

INCLUDE record: (Group G1, INCLUDE, {S1, S2})

EXCLUDE record: (Group G1, EXCLUDE, {S4})

In PC 220, if application 221 uses socket1, the socket1 state record is the following:

INCLUDE record: (Group G1, INCLUDE, {S5})

In PC 225, if application 226 uses socket1, the socket1 state record is the following:

INCLUDE record: (Group G1, INCLUDE, {S3})

The state record of the network interface of the CPE 228 operating as an IGMP proxy, after assembling the sources, is the following:

INCLUDE record: (Group G1, INCLUDE, {S3, S5})

In STB 231, the state record of the network interface 232, coinciding with the state of the network interface of the CPE 229, is the following:

INCLUDE record: (Group G1, INCLUDE, {S1})

Each CPE 208, 228 and 229 sends its IGMP messages to the DSLAM 240, which assembles them again but without mixing the INCLUDE and EXCLUDE sources.

The state record of the network interface of the DSLAM 240 operating as an IGMP proxy, after assembling the sources, is the following:

INCLUDE record: (Group G1, INCLUDE, {S1, S2, S3, S5})

EXCLUDE record: (Group G1, EXCLUDE, {S4})

In response to a General Query message sent by the router 260, the DSLAM 240 sends to the router 260 the message shown in FIG. 6, which is analyzed below.

Type==0×22 indicates that it is a Membership Report and Number of Group

Records=2 indicates that two data blocks or Group Records are sent for the same multicast group G1. One of the Group Records contains information about the INCLUDE sources and the other one about the EXCLUDE sources. The first Group Record has a Record Type equal to 1. This means that it is of the MODE_IS_INCLUDE type, i.e. it contains information about the INCLUDE sources. In this data block, Number of Sources is equal to 4, meaning that information of four INCLUDE sources is going to be sent. The multicast group G1 is indicated in the Multicast Address field. The four Source Address [1] to Source Address [4] fields contain information about the four INCLUDE sources: S1, S2, S3 and S5. A second Group Record is shown below with a Record Type equal to 2. This means that it is of the MODE_IS_EXCLUDE type, i.e. it contains information about the EXCLUDE sources. Number of Sources is equal to 1, meaning that information about one EXCLUDE source is going to be sent. The multicast group G1 is indicated in the Multicast Address field. The Source Address [1] field contains information about the EXCLUDE source: S4.

The router 260 has received complete information of all the sources. Now the requirements provided by the PIM-SM protocol for switching from the RPT tree to the SPT tree are met, as explained below.

The SwitchToSptDesired(S,G) condition of the PIM-SM protocol, which is the configurable part of the switching conditions for switching from the RPT tree to the SPT tree for the channel (S, G), is configured by default such that this condition is met when the first data packet arrives from the source S through the SPT tree. The non-configurable condition of said switching conditions is always met when the modified IGMP protocol is applied, because the router interested in received traffic from the source S will have always received an INCLUDE (S,G) IGMP message, or will have received an IGMP type message indicating that it wishes to receive traffic from all the sources of the group G and will not have received an EXCLUDE (S,G) IGMP message.

Therefore, when the modified IGMP protocol is applied, all the routers which have received traffic requests for a source can go to the SPT tree and receive the traffic from said source through the shortest path.

Therefore, in the example of FIG. 2 the traffic sent by sources S1, S2 and S3 will go through the shortest path 291, and the traffic sent by source S5 will go through the shortest path 292.

The router 260 can optionally connect directly, from the beginning, with the SPT tree of each source S1, S2, S3 and S5, since it knows the IP addresses of these sources and can therefore directly use the SPT tree. To that end, it is sufficient to make the SwitchToSptDesired(S,G) function always be true.

Furthermore, each host can optionally indicate to the router 260, in the actual IGMP message, when it must initiate the switch from the RPT tree to the SPT tree according to each source. To that end, according to the invention, a multicast address field is used which is outside the range of multicast addresses and in which a message is placed instead of a multicast address. For example, the first two bytes of the multicast address are set to 0 and the second two bytes are used to send the message to the router, associating the following meaning to these second two bytes:

100=connect directly by means of the SPT tree

200=use the default configuration of the router and evaluate the SwitchToSptDesired(S,G) function to decide to switch to the SPT tree 300=always use the RPT tree and never switch to the SPT tree The router detects that the address is outside the range of multicast addresses and interprets these 4 bytes as a message indicating the manner in which it must switch from the RPT tree to the SPT tree in the multicast address included after in the same Group Record.

5) Behavior when the Information of a Record Changes

In the modified IGMP protocol, when the state record of a network interface for a specific multicast group changes, the system must simply transmit the changes by sending a Source-List-Change Record message as indicated in the previous section.

This process is more complex in the IGMPv3 protocol because the system must take the filter-mode and the possible changes therein into account. This complexity does not exist in the modified IGMP protocol, because the information of the INCLUDE and EXCLUDE sources is stored and transmitted separately.

6) Behavior when a Host Receives a Membership Query Message

In the IGMPv3 protocol and in the modified IGMP protocol, the routers send messages referred to as Membership Query messages to the hosts so that the latter inform about the multicast groups and channels they wish to receive. In the modified IGMP protocol, the hosts send the routers a response message that is similar to the one they send in the IGMPv3 protocol, but with the difference that the information about the INCLUDE and EXCLUDE sources is sent separately.

Several timers are used to prevent the hosts from responding at the same time, which timers delay the responses of the hosts so as to distribute them for a time slot specified in the Membership Query message. This works the same way in the modified IGMP protocol and in the IGMPv3 protocol.

There are three types of Membership Query messages: General Query, Group-Specific Query and Group-and-Source-Specific Query.

General Query type messages are sent by the router every certain time period (125 seconds by default) so that all the hosts inform about the multicast groups and channels they wish to receive by sending Membership Report messages which are referred to as Current-State Record. The messages whereby the host responds to a General Query request include data blocks referred to as Group Records, which can be of two types:

Record Type=1 MODE_IS_INCLUDE

Record Type=2 MODE_IS_EXCLUDE

As seen above, several data blocks referred to as Group Records, such as the one shown in FIG. 5, are sent in a single message or Membership Report, such as the one shown in FIG. 4. The first field of FIG. 5, i.e. of the Group Record, is the Record Type field indicating the meaning of each data block (in the example of FIG. 5 the Record Type field is the field indicated as Type).

In the IGMPv3 protocol, since each multicast group can only be in the INCLUDE state or in the EXCLUDE state, each host only sends for each multicast group one Group Record, with Record Type having a value 1 or a value 2 according to the state of the INCLUDE or EXCLUDE group, respectively.

In the modified IGMP protocol, as a result of the fact that the information of the INCLUDE and EXCLUDE sources is stored and sent separately, it is possible that a host needs to send two Group Records for a single multicast group: a first Group Record with Record Type=1 for informing about the INCLUDE sources and a second Group Record with Record Type=2 for informing about the EXCLUDE sources. This can be seen in FIG. 6, where there are two Group Records for the same multicast group G1.

The same difference explained above exists for Group-Specific Query and Group-and-Source-Specific Query type messages: when the hosts reply to these messages they can send information separately from the INCLUDE and EXCLUDE sources using two Group Records.

7) Description of the Protocol for the Routers

The operation according to the modified IGMP protocol is very similar to that of the IGMPv3 and MLDv2 protocols. Therefore, the same nomenclature as that which is used in the RFC 3376 specification (IGMPv3 protocol) and RFC 3810 specification (MLDv2 protocol) mentioned at the beginning is used hereinafter to aid in understanding.

The main difference with respect to the IGMPv3 and MLDv2 protocols of the prior state of the art is that in the modified IGMP protocol, the router has two state records for each multicast group: an INCLUDE record and an EXCLUDE record.

The modified IGMP protocol allows the routers to make better use of the routing algorithms as a result of the fact that the routers receive from the hosts detailed information about the INCLUDE and EXCLUDE sources. The routers execute the IGMP protocol in all the networks they are directly connected to. If a multicast router has more than one network interface connected to the same network it only needs to execute the protocol in one of the network interfaces connected to that network. Unlike the IGMPv3 protocol, in the modified IGMP protocol the router no longer works exclusively in an INCLUDE or EXCLUDE mode for each multicast group and network interface. Therefore, it no longer needs all the mechanisms allowing it to change from the INCLUDE mode to the EXCLUDE mode and vice versa.

For each network card or network interface, and multicast group, the routers using the modified IGMP protocol store the information separately from the multicast INCLUDE and EXCLUDE sources in two records:

INCLUDE record: (multicast-address, INCLUDE, {source list and timers})

EXCLUDE record: (multicast-address, group-timer, EXCLUDE, {source list and timers})

where {source list and timers} is a list of elements (source-address, source-timer), where source-address is the source IP address and where source-timer is a timer associated to said source.

A timer is a variable in memory containing a value which regularly decreases over time until reaching zero.

The two INCLUDE and EXCLUDE records stored in the router therefore contain one source-timer associated to each source-address.

As explained above in point 2 relating to the ways of deleting a record, each EXCLUDE record associated to a multicast group further contains a group-timer used for eliminating the EXCLUDE state record when a specific time passes without the router having received reports with EXCLUDE type traffic requests.

As explained above, the routers periodically send the hosts messages referred to as Membership Query messages, such as the one in FIG. 3, so that the hosts reply informing about the groups and sources from which they wish to receive multicast traffic. The hosts can also send messages to the router to request multicast traffic without waiting for the host to send a Membership Query message.

The router uses the timers to make sure that, after having sent a Group Specific Query message or a Group and Source Specific Query message, all the hosts have had enough time to reply to said message. The value of the timers gradually drops over time and if the router receives a Membership Report message from a host the router reinitiates the corresponding timers again.

The timers in the INCLUDE record operate in the following way: for a specific network interface, a specific multicast group and a specific included source address, as long as the source-timer is greater than zero the router will continue transmitting the multicast traffic through said network interface from the channel (source, multicast group); when the source-timer reaches zero, the router will stop transmitting said traffic and will eliminate the source from the INCLUDE source list of that multicast group.

The timers in the EXCLUDE record operate in a similar way, but with the difference that the EXCLUDE sources are classified in two lists: a first list referred to as Requested List containing the sources the source-timer of which has a value greater than zero and a second list referred to as Exclude List containing the sources the source-timer of which has a value zero.

For each group Gi, the router transmits all the traffic requested by the INCLUDE sources. If there additionally is an EXCLUDE record for the group Gi, the router further transmits all the remaining traffic of the group Gi except the EXCLUDE sources from the Exclude List.

The reason for the existence of a Requested List is that in a network with several hosts sending messages to a Router, it is possible that there could be a conflict between the requests of the different hosts. This occurs, for example, when a host requests traffic from a specific source and another host requests traffic excluding said source. For example, a host1 sends a first EXCLUDE ({S1},G1) message and another host2 in the same Ethernet network then sends a second EXCLUDE ({S1,S2,S3},G1) message to the same router. Upon receiving the second message, if the router places the sources of the second message {S1,S2,S3} in the Exclude List, the host1 would stop receiving traffic from sources S2 and S3 that it wanted to receive from because it wanted to receive all the traffic except the traffic from source S1. To avoid this problem, the router places in the Exclude List only the intersection of the set of sources of the new message with the set of sources that there were in the Exclude List before receiving the message. The remaining EXCLUDE sources go to the Requested List and, optionally, the router sends a Group-And-Source Specific Query message to the host to ask if there is any host that is still interested in receiving traffic from sources S2 and S3 of group G1.

The principle for classifying the EXCLUDE sources into two lists, Requested List and Exclude List, according to the value of the source-timer is similar to the one applied in the IGMPv3 and MLDv2 protocols. The RFC 3810 specifications (MLDv2 protocol) mentioned at the beginning contain an explanation of this principle.

Table 1 (at the end of this document) shows the operation of an improved router applying the modified IGMP protocol according to the invention. In its initial state, the router has, for a specific multicast group G, two state records for said multicast group G because it has as INCLUDE sources and also EXCLUDE sources. In Table 1, the first column State 1 shows the initial state of the INCLUDE and EXCLUDE records of the router; the second column Message shows the content of a Membership Report message received by the router; the third column State 2 shows the state of said records of the router after having received the Membership Report message; the fourth and last column Actions shows the actions that the router carries out after having received said Membership Report message. The table contains six rows separated doted lines. Each row of the table is an example of the operation of the router based on an initial state and depending on the message it has received.

Table 1 refers to each multicast group G independently. Each multicast group G will have its own INCLUDE and EXCLUDE state records which will be affected by the messages the router receives referring to said G group.

The following nomenclature has been used in Table 1:
(A+B) means the union of the sets of sources A and B
(A*B) means the intersection of the sets of sources A and B
(A−B) means the set of sources A minus the sources of A that are also found in B.
INCLUDE (A), indicates that the router has an INCLUDE record with a set of sources referred to as A
EXCLUDE (X,Y) indicates that the router has an EXCLUDE state record because there are EXCLUDE sources
X is the Requested List
Y is the Exclude List
GMI is a parameter referred to as Group Membership Interval containing a time value. A value of 250 seconds is used by default.
LMQT is a parameter referred to as Last Member Query Time containing a time value. It is the time a host has to reply to a Group-And-Source Specific Query type message. After this time, if no host replies that it is interested in this data, the router stops transmitting them.
T (S) is the source timer of source S
GT is the "Group Timer", i.e. the timer of the EXCLUDE record for all the multicast group.
SEND Q(G, S) means that the router sends a Group-And-Source Specific Query message to the hosts to check if there is still a host interested in the sources S of the multicast group G. When this action is carried out, the router also reduces the timers of the sources S to the LMQT value. If the router receives in response a message showing interest in any of the sources S, it then initializes the value of the timers of said sources, for which there is an interested host, to an initial value equal to GMI.

An additional advantage of the modified IGMP protocol is that it allows the router to consult the two INCLUDE and EXCLUDE records before sending a "Source-And-Group Specific Query" type message and eliminating from the source list of the message some sources, such that the message can even be erased if all the sources are eliminated.

To that end, when the router receives a BLOCKIN(B) type message as in the example shown in row 4 of Table 1, before carrying out the action SEND Q(G, A*B) it can check if there is an EXCLUDE record for the same group G and eliminate from the message Q(G, A*B) all the sources that are not in the Exclude List because it means that someone has requested them by means of an EXCLUDE message.

In the same manner, when the router receives a BLOCKEX (B) type message like in the example shown in row 6 of Table 1, the router can consult the source list of the INCLUDE record and use that information to erase from the message Q(G, B-Y) the sources found in the INCLUDE record.

These two checks can eliminate a large number of Group-And-Source Specific Query messages, reducing traffic in the network and the number of messages that hosts and routers have to process.

8) Compatibility with an IGMPv3 Host

Routers using the modified IGMP protocol, referred to hereinafter as improved routers, can communicate with the hosts using the IGMPv3 protocol. For example, an Ethernet network can have hosts connected thereto operating with the IGMPv3 protocol and hosts operating with the modified IGMP protocol according to the invention.

To that end, an improved router able to take care of the new messages of the modified IGMP protocol also takes care of messages used by the IGMPv3 and MLDv2 protocols which are not used in the modified IGMP protocol.

When the improved router receives an ALLOW(B) type message, the router behaves as if it had received an ALLOWIN(B) message for sources on B which are in the INCLUDE record, and it behaves as if it had received an ALLOWEX (B) message for sources on B having an EXCLUDE state record.

If the sources on B of the ALLOW(B) message are in both the INCLUDE and EXCLUDE records of the router, the operation of the router can be configured so that it behaves as if it had received the two ALLOWIN(B) and ALLOWEX(B) messages or as if it had only received one of the two messages. It is possible to choose between these two options in the router configuration.

The case in which the router receives a BLOCK(B) type message is handled in the same way: the operation of the router can be configured so that it behaves as if it had received the two BLOCKIN(B) and/or BLOCKEX(B) messages.

When it receives a TO_IN(B) message, the router treats it as if it were an IS_IN(B) message because it is not necessary to change from the INCLUDE mode to the EXCLUDE mode and vice versa since the router can operate in dual mode.

In the same manner, when it receives a TO_EX(B) message, the router treats it as if it were an IS_EX(B) message.

9) Improved IGMP Proxy

The improved IGMP proxy according to the invention differs from the IGMP proxy defined in the RFC 4605 specifications mentioned at the beginning in that it separately stores and transmits the information about the INCLUDE and EXCLUDE sources.

The improved IGMP proxy can save two records for each network interface and multicast group:

INCLUDE record: (multicast-address, INCLUDE, {source list})

EXCLUDE record: (multicast-address, EXCLUDE, {source list})

The function of an IGMP proxy is to assemble the messages it receives from its network interfaces connected to the hosts to send a message assembled or summarized by the network interface connecting the IGMP proxy with the IGMP router or with another IGMP proxy. Said network interface towards the IGMP router is usually referred to as upstream interface.

To that end the IGMP proxy applies rules which are similar to the ones that have been explained above in section 3 to deduce the records from a network interface of a host based on the socket records, but with the difference that, since there are two separate records, one for the INCLUDE sources and another one for the EXCLUDE sources, to deduce the source list from the EXCLUDE source record it is not necessary to take into account the information about the INCLUDE sources, since said information is included in the INCLUDE source record.

These rules, which the improved IGMP proxy applies for each network interface and multicast group, are the following:

Rule 1. For each multicast group, each INCLUDE record contains the union of all the INCLUDE sources of the INCLUDE messages relating to said multicast group received in all the network interfaces of the proxy.

Rule 2. For each multicast group, each EXCLUDE record contains the intersection of all the EXCLUDE sources of the EXCLUDE messages relating to said multicast group received in all the network interfaces of the proxy.

To separately transmit to the router the information about the multicast groups containing both INCLUDE sources and EXCLUDE sources, the same message system with two "Group Records" as that which is explained in point 4 is used.

The improved IGMP proxy can work simultaneously with hosts using the IGMPv3 protocol and with hosts using the modified IGMP protocol according to the invention.

TABLE 1

| STATE 1 | MESSAGE | STATE 2 | ACTIONS |
|---|---|---|---|
| INCLUDE (A) | IS_IN (B) | INCLUDE (A + B) | T(B) = GMI |
| EXCLUDE (X,Y) | | EXCLUDE (X,Y) | |
| INCLUDE (A) | IS_EX (B) | INCLUDE (A) | |
| EXCLUDE (X,Y) | | EXCLUDE (B - Y,Y * B) | T(B - X - Y) = G |
| | | | DEL (X - B) |
| | | | DEL (Y - B) |
| | | | GT = GMI |
| INCLUDE (A) | ALLOWIN (B) | INCLUDE (A + B) | T(B) = GMI |
| EXCLUDE (X,Y) | | EXCLUDE (X,Y) | |
| INCLUDE (A) | BLOCKIN (B) | INCLUDE (A) | SEND Q(G,A |
| EXCLUDE (X,Y) | | EXCLUDE (X,Y) | T(A*B) = LMQ |
| INCLUDE (A) | ALLOWEX (B) | INCLUDE (A) | T(B) = GMI |
| EXCLUDE (X,Y) | | EXCLUDE (X + B,Y - B) | |
| INCLUDE (A) | BLOCKEX (B) | INCLUDE (A) | T (B - X - Y) = G |
| EXCLUDE (X,Y) | | EXCLUDE (X + B - Y),Y) | SEND Q(G,B |
| | | | T (B - X - Y) = L |

What is claimed is:

1. A multicast router situated in a data network system between sources that send multicast packets to at least one multicast group address and one or more hosts that request data from the multicast group address and sources, the multicast router comprising:
    one or more downstream network interfaces;
    a storage medium that stores for a downstream network interface and multicast group address at least one INCLUDE source record and at least one EXCLUDE source record, the INCLUDE source record containing information about include source lists derived by data requests made by the one or more hosts and the EXCLUDE source record containing information about exclude source lists derived by data requests made by the one or more hosts;
    a source-timer for each of the sources in the include and exclude source lists, the exclude source lists including a Requested List containing a list of sources having a source-timer of a value greater than zero and an Exclude List containing a list of sources having a source-timer of a value zero; and wherein
    the downstream network interface transmits for each multicast group address multicast packets to the hosts based on the information of the at least one INCLUDE source record and the at least one EXCLUDE source record by transmitting for each INCLUDE source of a multicast group address having a source-timer of a value greater than zero multicast packets through the network interface and also transmitting multicast packets of the remaining sources of the multicast group address through the network interface except the EXCLUDE sources from the Exclude List; and
    the multicast router using a host-router multicast routing protocol based on the IGMP (Internet Group Management Protocol) or the MLD (Multicast Listener Discovery) protocol to communicate with the one or more hosts and a router-router multicast routing protocol to communicate with at least one other multicast router situated between the multicast router and the sources.

2. The multicast router according to claim 1, wherein the INCLUDE source record stored in the multicast router contains the union of all the include source lists requested from the hosts.

3. The multicast router according to claim 1, wherein the EXCLUDE source record stored in the multicast router contains the intersection of all the exclude source lists requested from the hosts.

4. The multicast router according to claim 1, wherein the multicast router stores for the downstream network interface and multicast group address only one INCLUDE source record and only one EXCLUDE source record, the INCLUDE source record containing the union of all the source lists requested from the hosts and the EXCLUDE source record containing the intersection of all the exclude source lists requested from the hosts.

5. The multicast router according to claim 1, wherein the at least one INCLUDE source record for the downstream network interface and multicast group address comprises (multicast-address, INCLUDE, {source list and timers}) and the at least one EXCLUDE source record comprises (multicast-address, EXCLUDE, {source list and timers}), where {source list and timers} comprise a list of elements {source-address and source-timer}, and where source-address comprises the source IP address, and where source-timer comprises a timer associated to the source.

6. The multicast router according to claim 1, wherein the multicast router contains executable instructions for updating the at least one INCLUDE source record and the at least one EXCLUDE source record upon receiving a state message or change of state message originating from the one or more of hosts.

7. The multicast router according to claim 1, wherein the multicast router is capable of receiving a state message originating from one or more hosts that includes instructions about a method the multicast router must apply to set up routing trees from the source to the multicast router.

8. The multicast router according to claim 1, wherein the multicast router stores executable instructions for (1) keeping, for each downstream network interface and multicast group address, at least two separate records: the INCLUDE source record and the EXCLUDE source record, and (2) updating the INCLUDE source record and the EXCLUDE source record, for each multicast group address, when the multicast router receives, through the multicast router's downstream network interface, a message containing information about an include source list and information about an exclude source list originating from one or more of the hosts.

9. The multicast router according to claim 1, wherein for a multicast group address the multicast router includes an upstream network interface that requests the data from the source via the at least one other multicast router situated within a routing tree between the sources and the multicast router, the upstream network interface communicates with the at least one other multicast router via the router-router multicast routing protocol to request the data from the sources using the information in the INCLUDE source record and the information in the EXCLUDE source record to permit a direct connection with the sources through a shortest path tree of the routing tree.

10. The multicast router according to claim 9, wherein the router-router multicast routing protocol is a version of a PIM (Protocol Independent Multicast) protocol.

11. The multicast router according to claim 1, wherein for a multicast group address the multicast router includes an upstream network interface that requests the data from the source via a plurality of multicast routers which include a Rendezvous Point Router, the plurality of multicast routers situated within a routing tree between the source and the multicast router, the routing tree including rendezvous point trees (RPT) and shortest path trees (SPT) for the source, the upstream network interface communicates with the plurality of multicast routers via the router-router multicast routing protocol to request the data from the sources using the information in the INCLUDE source record and the information in the EXCLUDE source record to permit a direct connection with the source via the shortest path trees without the need to use the rendezvous point trees.

12. The multicast router according to claim 11, wherein the router-router multicast routing protocol is a version of a PIM (Protocol Independent Multicast) protocol.

13. The multicast router of claim 1, wherein upon receiving in a downstream network interface an IS_IN(x) type message for a multicast group address no EXCLUDE source records for the multicast group are modified.

14. The multicast router of claim 1, wherein upon receiving in a downstream network interface an IS_EX(x) type message for a multicast group address no INCLUDE source record is modified.

15. The multicast router according to claim 1, wherein for each downstream interface and multicast group address the multicast router first transmits to the hosts data from the sources in the include source lists and then transmits to the hosts data from all the remaining sources except those sources from the Exclude List.

16. The multicast router according to claim 1, wherein the multicast router is configured to receive messages originating from the one or more hosts requesting the multicast router to stop sending data from a multicast group address and a source and to send Group-And-Source-Specific Query type messages to the one or more hosts, the multicast router storing executable instructions for determining whether one or more other hosts are receiving data from the multicast group address and source upon receiving the stop request using the at least one INCLUDE source record and the at least one EXCLUDE source record and to continue sending data from the multicast group address and source to the one or more other hosts without sending a Group-And-Source-Specific Query messages to the one or more other hosts receiving data from the multicast group address and source.

* * * * *

UNITED STATES PATENT AND TRADEMARK OFFICE
CERTIFICATE OF CORRECTION

| | | Page 1 of 1 |
|---|---|---|
| PATENT NO. | : 7,640,333 B1 | |
| APPLICATION NO. | : 12/392958 | |
| DATED | : December 29, 2009 | |
| INVENTOR(S) | : Alvaro Fernández Gutiérrez | |

It is certified that error appears in the above-identified patent and that said Letters Patent is hereby corrected as shown below:

In the Specification, on Page 43, Col. 23, Lines 26-49, Table 1 should be deleted and replaced with the following:

Table 1

| STATE 1 | MESSAGE | STATE 2 | ACTIONS |
|---|---|---|---|
| INCLUDE (A) EXCLUDE (X,Y) | IS_IN (B) | INCLUDE (A+B) EXCLUDE (X,Y) | T(B)=GMI |
| INCLUDE (A) EXCLUDE (X,Y) | IS_EX (B) | INCLUDE (A) EXCLUDE (B-Y,Y*B) | T(B-X-Y)=GMI DEL(X-B) DEL(Y-B) GT=GMI |
| INCLUDE (A) EXCLUDE (X,Y) | ALLOWIN (B) | INCLUDE (A+B) EXCLUDE (X,Y) | T(B)=GMI |
| INCLUDE (A) EXCLUDE (X,Y) | BLOCKIN (B) | INCLUDE (A) EXCLUDE (X,Y) | SEND Q(G,A*B) T(A*B)=LMQT |
| INCLUDE (A) EXCLUDE (X,Y) | ALLOWEX (B) | INCLUDE (A) EXCLUDE (X+B,Y-B) | T(B)=GMI |
| INCLUDE (A) EXCLUDE (X,Y) | BLOCKEX (B) | INCLUDE (A) EXCLUDE (X+(B-Y),Y) | T(B-X-Y)=GT SEND Q(G,B-Y) T(B-X-Y)=LMQT |

Signed and Sealed this
Fifth Day of April, 2011

David J. Kappos
*Director of the United States Patent and Trademark Office*